US011992911B2

(12) United States Patent
Cho et al.

(10) Patent No.: US 11,992,911 B2
(45) Date of Patent: May 28, 2024

(54) TOOL CHANGING MECHANISM HAVING FUNCTION OF CONTROLLING LOOSENING AND PULLING TOOL

(71) Applicant: PRECISION MACHINERY RESEARCH & DEVELOPMENT CENTER, Taichung (TW)

(72) Inventors: Chia-Hsuan Cho, Taichung (TW); Yu-An Liu, Taichung (TW)

(73) Assignee: PRECISION MACHINERY RESEARCH & DEVELOPMENT CENTER, Taichung (TW)

( * ) Notice: Subject to any disclaimer, the term of this patent is extended or adjusted under 35 U.S.C. 154(b) by 222 days.

(21) Appl. No.: 17/489,933

(22) Filed: Sep. 30, 2021

(65) Prior Publication Data

US 2023/0102601 A1   Mar. 30, 2023

(51) Int. Cl.
*B23Q 3/14* (2006.01)
*B23B 31/26* (2006.01)
*B23B 31/24* (2006.01)

(52) U.S. Cl.
CPC .............. *B23Q 3/14* (2013.01); *B23B 31/265* (2013.01); *B23B 31/24* (2013.01); *Y10T 29/5155* (2015.01); *Y10T 409/309464* (2015.01)

(58) Field of Classification Search
CPC ........... Y10T 409/3094; Y10T 408/953; Y10T 409/309464; B23Q 3/14; B23B 39/34; B23B 31/1276; B23B 31/1292; B23B 31/20; B23B 31/24; B23B 31/261; B23B 31/265; B23B 31/4026; B23B 31/4033; B23B 31/406; B23B 31/4066; B23B 29/34

USPC ........................................... 409/233; 408/240
See application file for complete search history.

(56) References Cited

U.S. PATENT DOCUMENTS

| | | | | |
|---|---|---|---|---|
| 3,753,383 A | * | 8/1973 | Schmidt ................ | B23B 31/266 |
| | | | | 279/155 |
| 7,137,180 B2 | * | 11/2006 | Matsumoto .......... | B23Q 1/5406 |
| | | | | 74/826 |
| 10,252,389 B2 | * | 4/2019 | Filho ..................... | B23B 31/263 |

(Continued)

FOREIGN PATENT DOCUMENTS

| | | | | |
|---|---|---|---|---|
| DE | 3813670 A | * 11/1989 | ........... | B23B 31/261 |
| DE | 102016110973 A1 | * 12/2017 | ........... | B23B 31/207 |

(Continued)

*Primary Examiner* — Erica E Cadugan
*Assistant Examiner* — Michael Vitale
(74) *Attorney, Agent, or Firm* — Muncy, Geissler, Olds & Lowe, P.C.

(57) ABSTRACT

A tool changing mechanism includes a tool base housing, a mandrel disposed therein and having a chamber and a keyway provided axially, and first and second linked units. A first shoulder portion is provided at an end of the keyway, and pulling jaws are disposed at the other end. The first linked unit has a first pulling rod, an end of which has an external thread, and the other end has a connecting portion driven by a pneumatic cylinder. The second linked unit has a second pulling rod, an end of which has an internal thread, and a pressing head is disposed at the other end. The second pulling rod has a sliding key located in the keyway. The first pulling rod is screwed into the second pulling rod, and the relative screwing rotation therebetween attains tool pulling for fixing or tool loosening for removing the cutting tool.

2 Claims, 9 Drawing Sheets

(56) References Cited

U.S. PATENT DOCUMENTS

| | | | |
|---|---|---|---|
| 2005/0236169 A1* | 10/2005 | Xiao | B23Q 5/326 |
| | | | 173/213 |
| 2009/0116924 A1* | 5/2009 | Shinano | B23B 31/265 |
| | | | 409/231 |
| 2017/0014965 A1* | 1/2017 | Baldaccini | B23B 31/2072 |
| 2017/0232525 A1* | 8/2017 | Curtis | B23F 23/06 |
| | | | 279/155 |
| 2020/0086399 A1* | 3/2020 | Dupont | B23B 31/265 |
| 2020/0130067 A1* | 4/2020 | Makabe | B23Q 17/005 |

FOREIGN PATENT DOCUMENTS

| | | | | |
|---|---|---|---|---|
| EP | 1166932 A1 * | 1/2002 | | B23B 31/265 |
| TW | 574955 | 2/2004 | | |
| WO | WO-2018215636 A1 * | 11/2018 | | B23B 31/265 |

* cited by examiner

TOOL CHANGING MECHANISM HAVING FUNCTION OF CONTROLLING LOOSENING AND PULLING TOOL

BACKGROUND OF THE INVENTION

1. Field of the Invention

The present invention relates to tool changing systems of turning and milling complex machine tools and more particularly, to a tool changing mechanism having a function of controlling loosening and pulling a tool.

2. Description of the Related Art

For the conventional tool loosening and tool pulling technology of a spindle of a machine tool, Taiwan Patent No. 574955 disclosed a spindle tool pulling mechanism improvement. For the tool loosening in the patent, as shown in FIGS. 2-6 of the aforementioned patent, a pneumatic cylinder 15 is actuated to push a pneumatic cylinder pushing block 152 to move downwardly as shown in FIG. 3. At this time, a guiding pin 23 pushes a force multiplying sliding sleeve 25 to move and thereby relieves its pulling force. When a tool unclamping hitting block 151 of the pneumatic cylinder 15 contacts a spindle pulling rod 22 and pushes the spindle pulling rod 22, the spindle pulling rod 22 drives a tool clamping claw 27 to withdraw from a lower section axial hole 213 of the spindle 21 to attain a tool loosening action.

For the tool pulling, the pneumatic cylinder 15 pulls back, and the force multiplying sliding sleeve 25 is acted by the restoring force of a disc spring 26 to upwardly push and contact an elastic sleeve 28 as shown in FIG. 5. Furthermore, when the force multiplying sliding sleeve 25 continues pushing upwardly, the top side edge thereof acts on slopes 251 and 282 between top inside walls of the elastic sleeve 28 to push the elastic sleeve 28 back to be positioned on a slope 214 on the top end of the spindle 21. Meanwhile, a pressure ring 24 is pushed by the elastic sleeve 28 to drive the spindle pulling rod 22 to move upwardly, and the spindle pulling rod 22 drives the tool clamping claw 27 to retract into the lower section axial hole 213 to attain a tool pulling action as shown in FIG. 6.

The aforementioned conventional tool loosening and tool pulling technology needs the restoring force of the disc spring 26 to push the elastic sleeve 28, so there should be a space large enough to accommodate the disc spring 26, which increases the volume of the tool loosening and tool pulling mechanism, bringing inconvenience in usage.

SUMMARY OF THE INVENTION

It is an objective of the present invention to provide a tool changing mechanism having a function of controlling loosening and pulling a tool, which is reduced in the required space, so that the volume of the tool changing mechanism is relatively smaller.

To attain the above objective, the present invention provides a tool changing mechanism having a function of controlling loosening and pulling a tool, which includes a tool base housing provided therein with an accommodating space, a mandrel disposed in the tool base housing and located in the accommodating space, a first linked unit, and a second linked unit. The mandrel is formed therein with a chamber communicating with two ends of the mandrel. The chamber of the mandrel is axially provided in a middle section thereof with a keyway. The chamber is formed with a first shoulder portion located at an end of the keyway. A predetermined number of pulling jaws are pivotably disposed at another end of the keyway. The first linked unit is located in the chamber. The first linked unit has a first pulling rod. An end of the first pulling rod has an external thread. Another end of the first pulling rod has a connecting portion. The connecting portion is able to be driven by a pneumatic cylinder. The second linked unit is located in the chamber. The second linked unit has a second pulling rod and a pressing head. The second pulling rod is arranged along the axis of the mandrel. An end of the second pulling rod has an internal thread. The pressing head is disposed at another end of the second pulling rod. The second pulling rod is embedded in the body thereof with a sliding key. The sliding key corresponds to the keyway of the mandrel. The internal thread of the second pulling rod is screwed onto the external thread of the first pulling rod, and the relative screwing rotation therebetween enables the second pulling rod and the first pulling rod to approach or leave each other. When the second pulling rod approaches the first pulling rod, the pressing head approaches the pulling jaws to bring a pressing state. When the second pulling rod leaves the first pulling rod, the pressing head leaves the pulling jaws to bring a relieve pressing state.

As a result, the present invention provides a tool changing mechanism having the function of controlling loosening and pulling a tool. The first and second pulling rods are moved relative to each other by the screwing rotation thereof, which is more space-saving and thereby causes the tool changing mechanism relatively smaller volume when compared with the prior art of providing the moving effect by a disc spring.

DETAILED DESCRIPTION OF THE INVENTION

For specifying the technical features of the present invention, a preferred embodiment is instanced in the following and described in coordination with the accompanying drawings.

Figure 1:
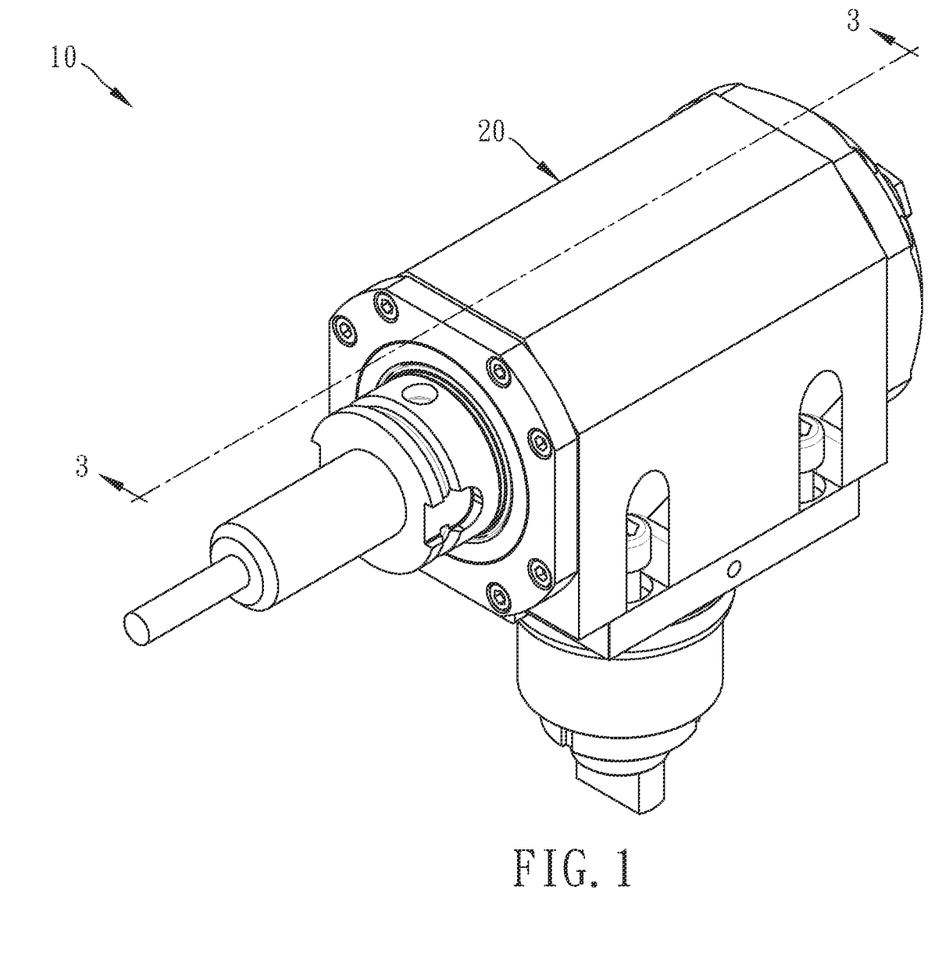
FIG. 1 is a perspective view of a preferred embodiment of the present invention.
Figure 2:
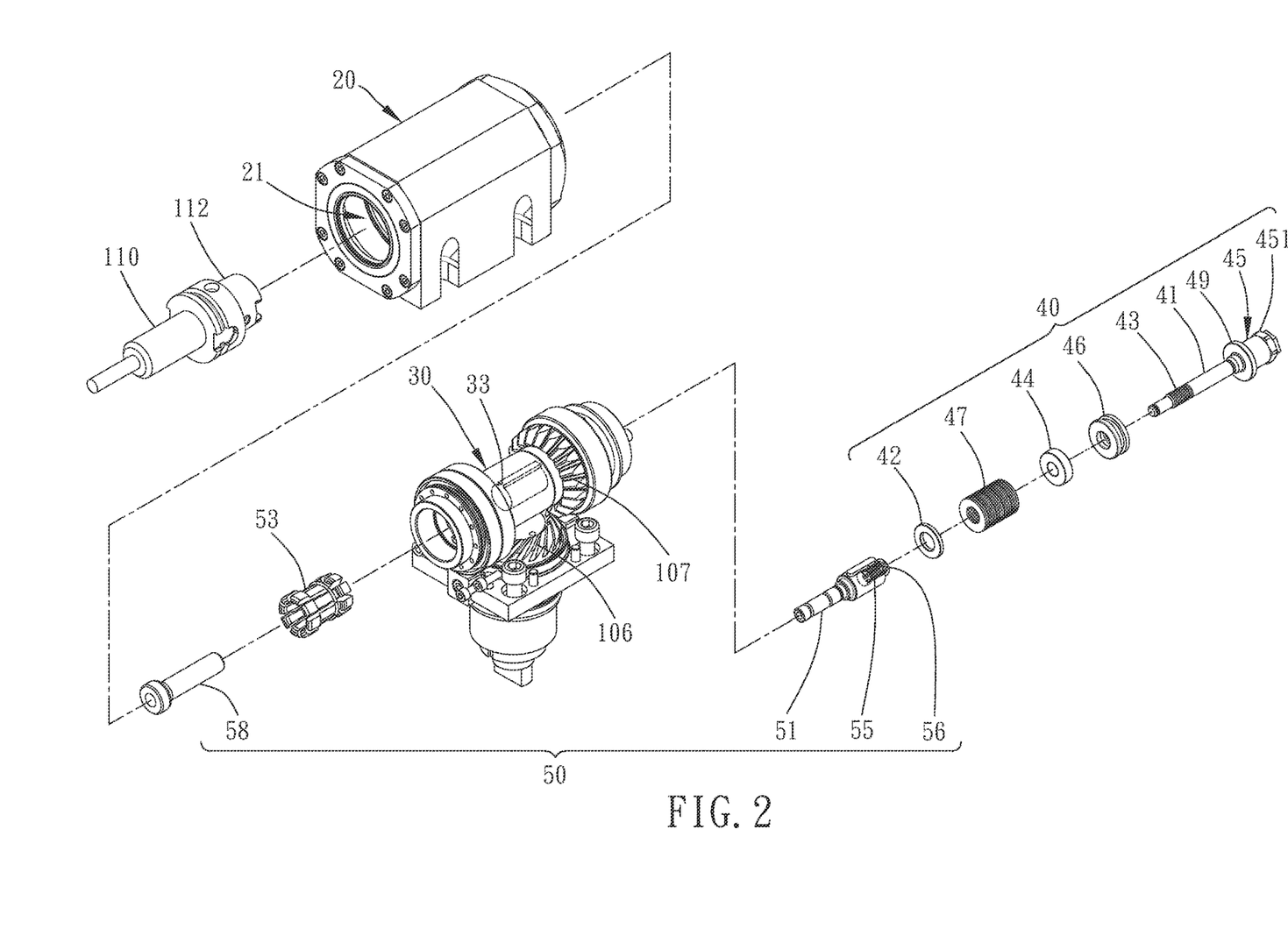
FIG. 2 is an exploded view of a preferred embodiment of the present invention.
Figure 3:
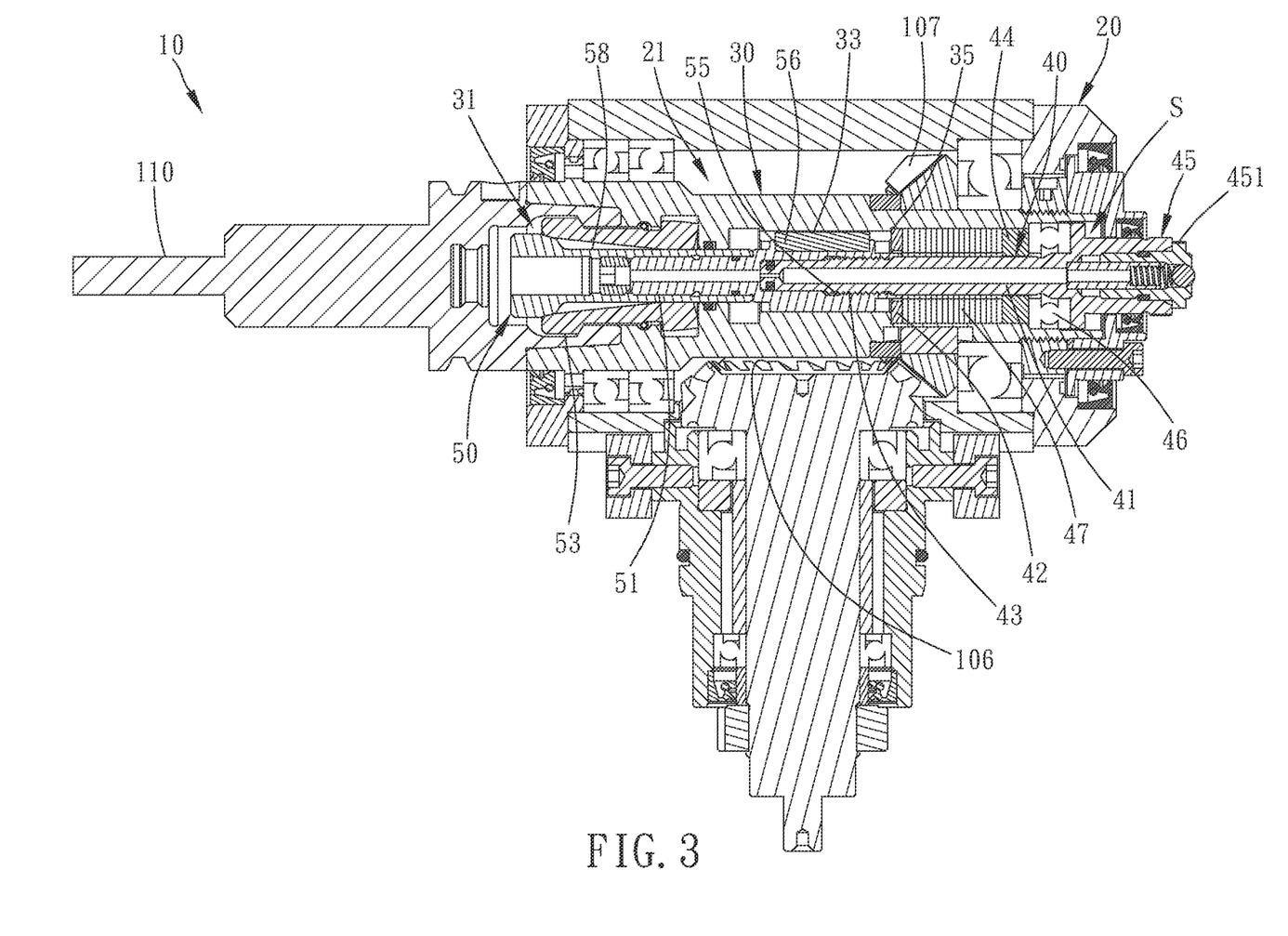
FIG. 3 is a sectional view taken along the line 3-3 in FIG. 1.

As shown in FIGS. 1-3, a first preferred embodiment of the present invention provides a tool changing mechanism 10 having a function of controlling loosening and pulling a tool, which is primarily composed of a tool base housing 20, a mandrel 30, a first linked unit 40, and a second linked unit 50.

The tool base housing 20 is provided therein with an accommodating space 21.

The mandrel 30 is disposed in the tool base housing 20 and located in the accommodating space 21. The mandrel 30 is formed therein with a chamber 31 communicating with two ends of the mandrel. The chamber 31 of the mandrel 30 is axially provided in the middle section thereof with a keyway 33. The chamber 31 is formed with a first shoulder portion 35 located at an end of the keyway 33. A predetermined number of pulling jaws 53 are pivotably disposed at another end of the keyway. The pulling jaws 53 are adapted to pull and fix a tool base 112 of a cutting tool 110.

Figure 6:
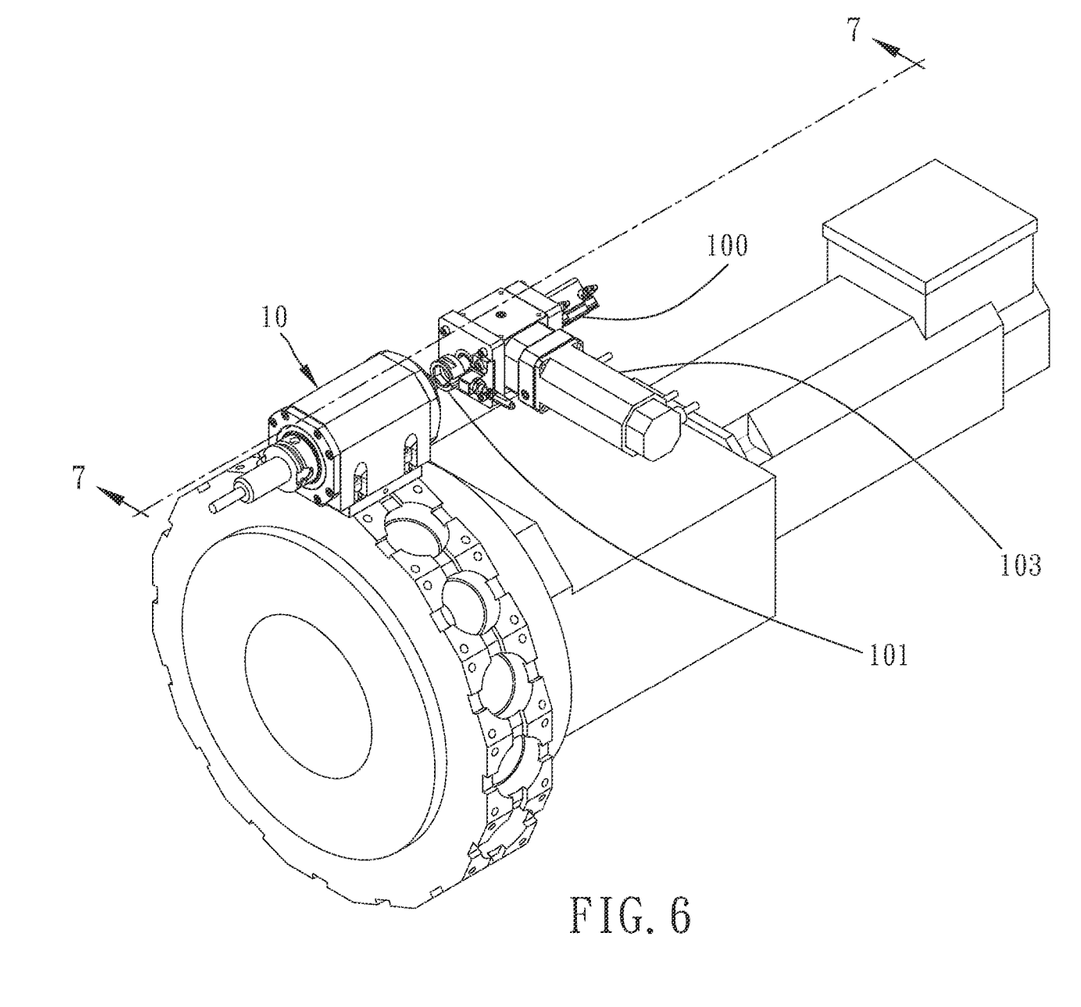
FIG. 6 is a perspective view showing a first use condition of a preferred embodiment of the present invention that a tool changing mechanism is connected with a servomotor.

The first linked unit 40 is located in the chamber 31. The first linked unit 40 has a first pulling rod 41. An end of the first pulling rod 41 has an external thread 43, another end has a connecting portion 45, and a second shoulder portion is provided between the connecting portion 45 and the external thread 43. The connecting portion 45 is able to be driven by a pneumatic cylinder 100 as shown in FIG. 6, and the outermost side thereof has an outer hexagonal end 451. An inner hexagonal sleeve 101 disposed on the pneumatic cylinder 100 can be sleeved onto the outer hexagonal end 451.

The first linked unit 40 further has a spacer ring 42, an anti-thrust spacer ring 44, a bearing 46, and a disc spring 47. The spacer ring 42 is located between the first shoulder portion 35 and the disc spring 47. The anti-thrust spacer ring 44 is located between the disc spring 47 and the bearing 46. The disc spring 47 is sleeved onto the first pulling rod 41 and indirectly abutted against the first shoulder portion 35 and the second shoulder portion 49. When the disc spring 47 is in a compressed status, a space S is formed between the second shoulder portion 49 and an end edge of the mandrel 30, as shown in FIG. 3.

Figure 5:
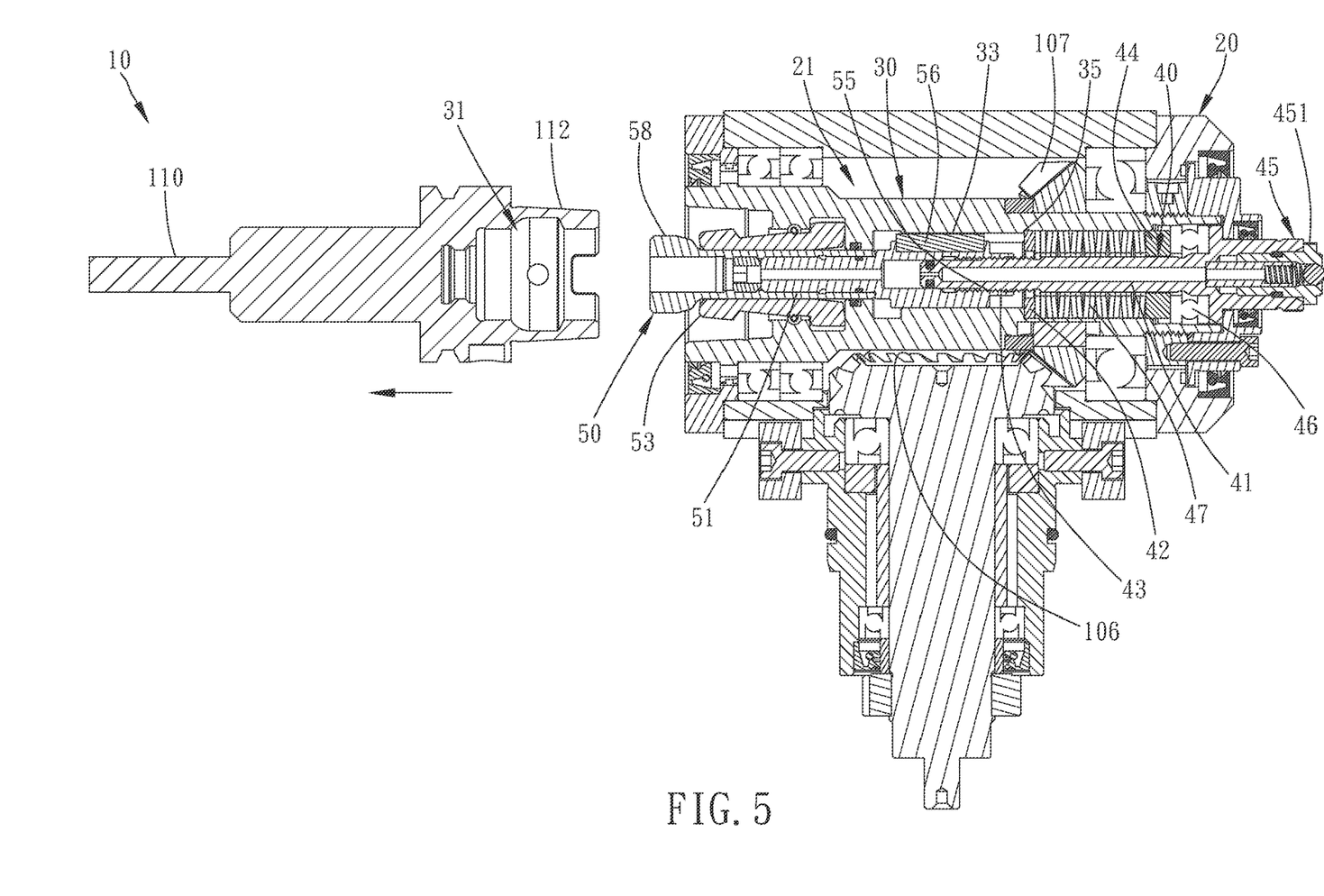
FIG. 5 is a sectional view showing another action of a preferred embodiment of the present invention.

The second linked unit 50 is located in the chamber 31. The second linked unit 50 has a second pulling rod 51 and a pressing head 58. The second pulling rod 51 is arranged along the axis of the mandrel 30. An end of the second pulling rod 51 has an internal thread 55, and another end is connected with the pressing head 58. The second pulling rod 51 is embedded in the body thereof with a sliding key 56. The sliding key 56 corresponds to the keyway 33 of the mandrel 30. The internal thread 55 of the second pulling rod 51 is screwed onto the external thread 43 of the first pulling rod 41, and the relative screwing rotation therebetween enables the second pulling rod 51 and the first pulling rod 41 approach or leave each other. In other words, when the first pulling rod 41 rotates without displacement, the second pulling rod 51 is moved to approach the first pulling rod 41 and meanwhile cause the pressing head 58 to approach the pulling jaws 53 located in the chamber 31 of the mandrel 30, thereby bringing a pressing state as shown in FIG. 3 for fixing the turning or milling tool 110. On the contrary, when the second pulling rod 51 leaves the first pulling rod 41, the pressing head 58 leaves the pulling jaws 53 to bring a relieve pressing state as shown in FIG. 5 for changing the cutting tool 110. The structure enabling the pressing head 58 to drive the pulling jaws 53 to press or loosen the tool base 112 of the cutting tool 110 belongs to the prior art, so it will not be specified here.

The composed components and structure of a preferred embodiment of the present invention are described above.

Two preferred usages of a preferred embodiment of the present invention on a complex processing machine will be described in the following.

Figure 4:
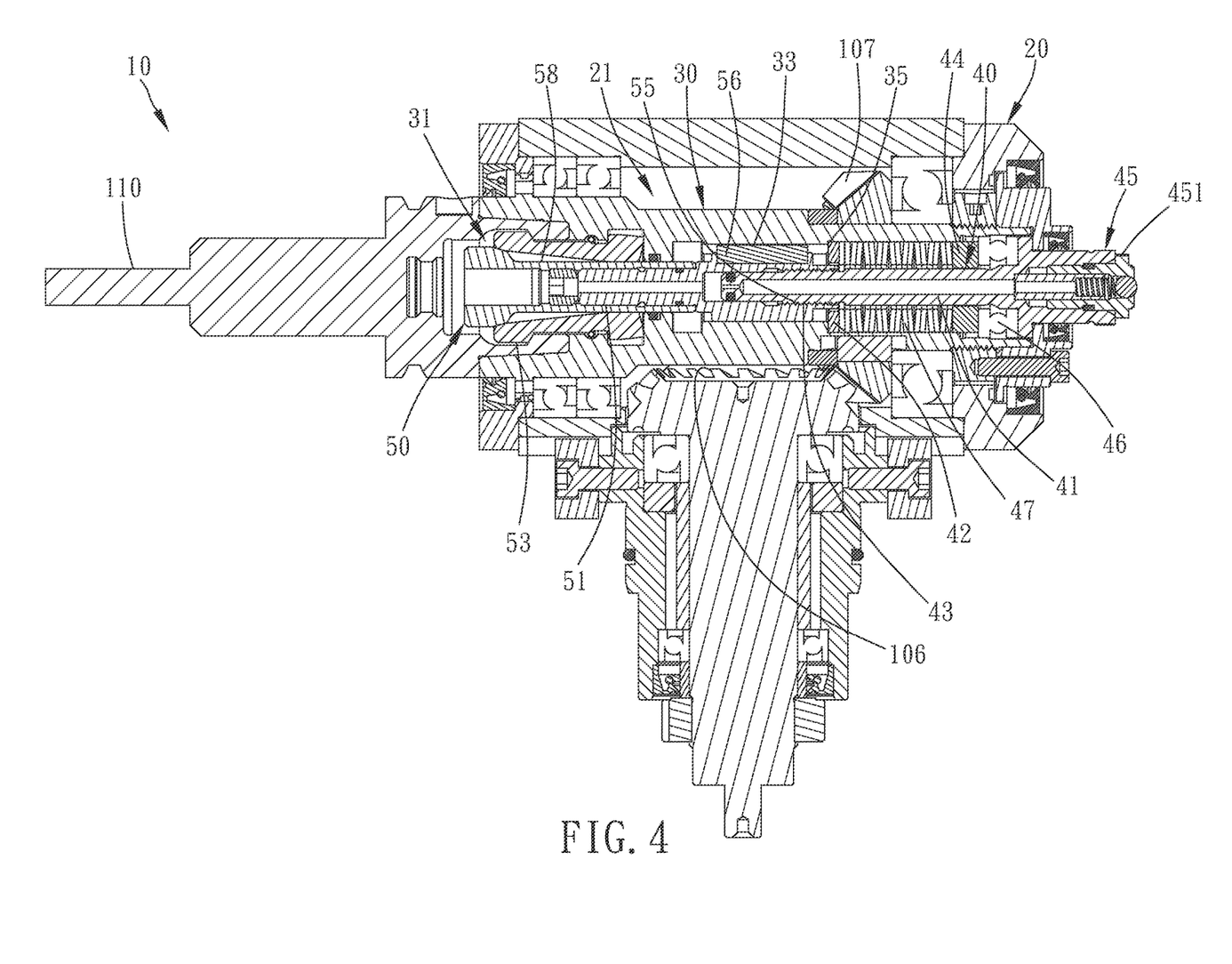
FIG. 4 is a sectional view showing an action of a preferred embodiment of the present invention.
Figure 7:
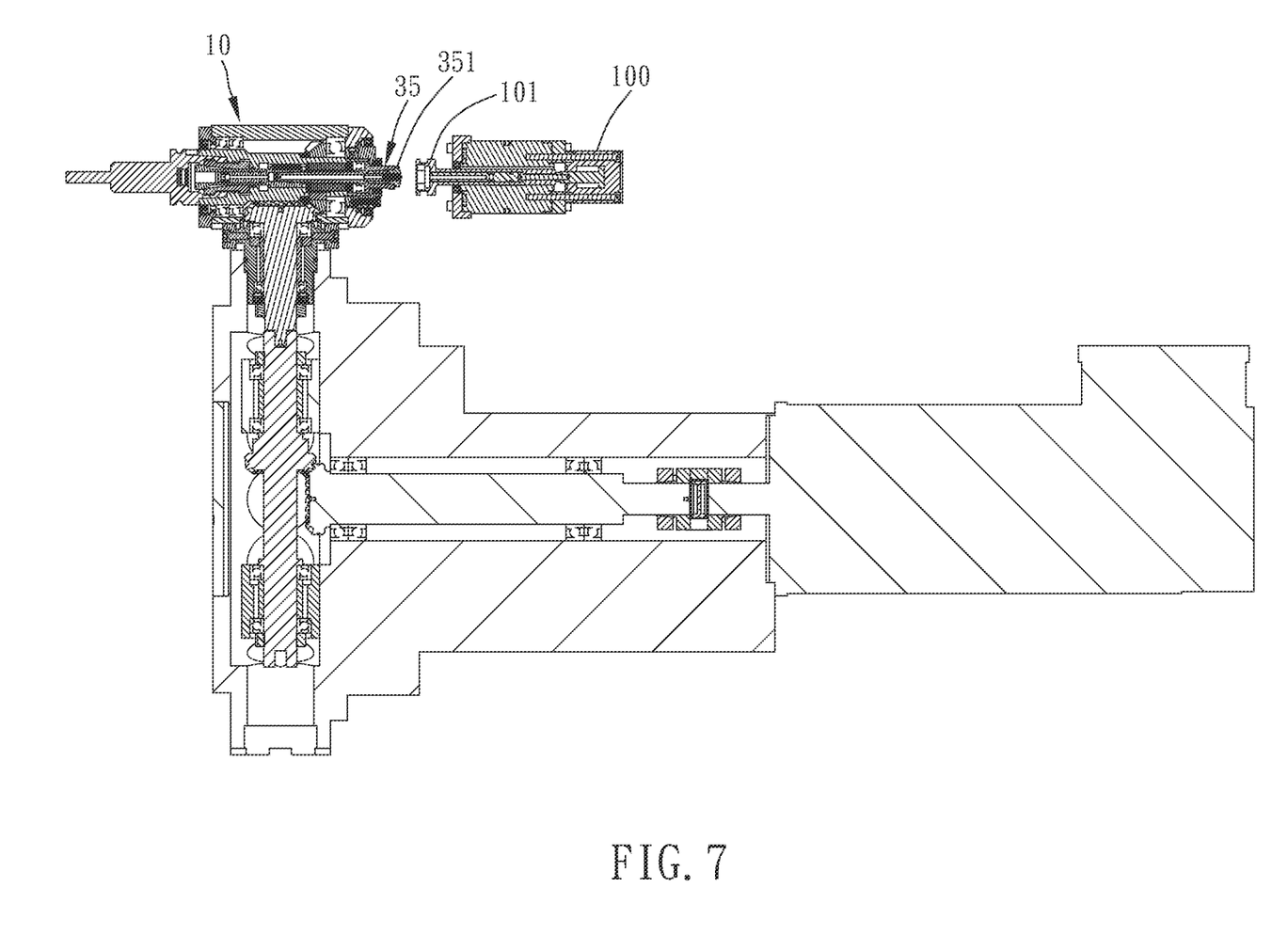
FIG. 7 is a sectional view taken along the line 7-7 in FIG. 6.

Referring to FIG. 6 and FIG. 7, the first usage of the present invention is the usage in coordination with a servomotor 103. When the tool changing mechanism 10 of the present invention performs the tool pulling to fix the tool 110, the pneumatic cylinder 100 is operated to push the inner hexagonal sleeve 101 to be connected with the outer hexagonal end 451 of the first pulling rod 41, and then the forward rotation of the servomotor 103 synchronously drives the first pulling rod 41 to rotate. When the tool changing mechanism 10 is in the tool loosening status as shown in FIG. 5, the disc spring 47 is in a relieved status, so the space S doesn't exist at this time. The sliding key 56 of the second pulling rod 51 is limited by the keyway 33 of the mandrel 30, thereby only movable along the longitudinal axis of the mandrel 30, which means when the servomotor 103 rotates forward to make the second pulling rod 51 approach the first pulling rod 41, it causes the pressing head 58 and the pulling jaws 53 the pressing state, i.e. changed from the status as shown in FIG. 5 to the status as shown in FIG. 4, thereby attaining the tool pulling effect. After that, the servomotor 103 continues driving the first pulling rod 41 to rotate. At this time, the pressing head 58 and the pulling jaws 53 are in the pressing state, so the second pulling rod 51 no longer moves, resulting in that the first pulling rod 41 starts to approach the second pulling rod 51 along the mandrel 30, i.e. changed from the status as shown in FIG. 4 to the status as shown in FIG. 3, and the disc spring 47 is compressed. Until the disc spring 47 is completely compressed, the servomotor 103 stops rotating, and the pneumatic cylinder 100 separates the inner hexagonal sleeve 101 from the outer hexagonal end 451 of the connecting portion 45, so that the tool changing mechanism 10 of the present invention completes the tool pulling action for fixing the cutting tool 110.

When the tool changing mechanism 10 of the present invention is intended for tool loosening for the previously fixed cutting tool 110 to be removed, the pneumatic cylinder 100 is also operated to push the inner hexagonal sleeve 101 to be connected with the outer hexagonal end 451 of the first pulling rod 41, and then the backward rotation of the servomotor 103 drives the first pulling rod 41 to rotate. Because the disc spring 47 is compressed to provide the space S in the final part of the tool pulling status of the tool changing mechanism 10 as shown in FIG. 3, the first pulling rod 41 starts to leave the second pulling rod 51 along the mandrel 30, changed from the status as shown in FIG. 3 to the status as shown in FIG. 4, and the disc spring 47 is relieved. Until the disc spring 47 is completely relieved and the space S is filled, the first pulling rod 41 no longer moves. At this time, the servomotor 103 continues driving the first pulling rod 41 to rotate, so it makes the second pulling rod 51 start to leave the first pulling rod 41, i.e. changed from the status as shown in FIG. 4 to the status as shown in FIG. 5, causing the pressing head 58 and the pulling jaws 53 the relieve pressing state, so that the tool changing mechanism of the present invention completes the tool loosening action for the cutting tool 110 to be removed and the tool loosening process in turning or milling.

As a result, the present invention provides a tool changing mechanism 10 having the function of controlling loosening and pulling the tool. By the technical features that the first pulling rod 41 has the external thread 43, the second pulling rod 51 has the internal thread 55, and the disc spring 47 and the space S are provided, when the present invention is in the tool pulling status, a slight external force will not cause the second pulling rod 51 to displace to result in the tool loosening status, so that the present invention has improved stability for pulling the tool base 112.

In addition, for the tool changing mechanism 10 having the function of controlling loosening and pulling the tool provided by the present invention, the screwing rotation of the first pulling rod 41 having the external thread 43 and the second pulling rod 51 having the internal thread 55 makes the first and second pulling rods 41 and 51 move relative to each other, which is more space-saving and thereby causes the tool changing mechanism 10 relatively smaller volume when compared with the prior art of providing the moving effect by a disc spring.

Figure 8:
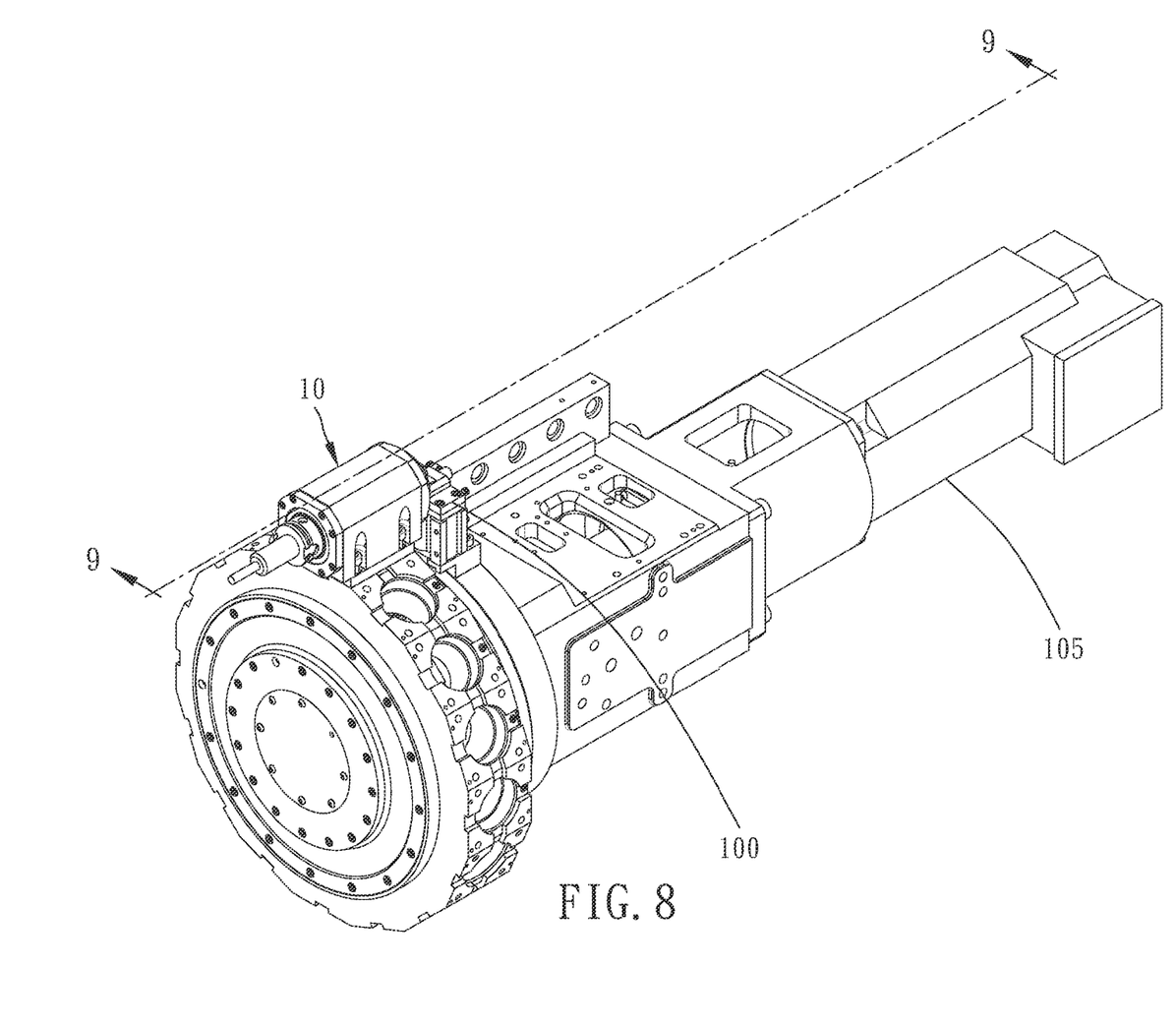
FIG. 8 is a perspective view showing a second use condition of a preferred embodiment of the present invention that the tool changing mechanism is connected with a spindle motor.
Figure 9:
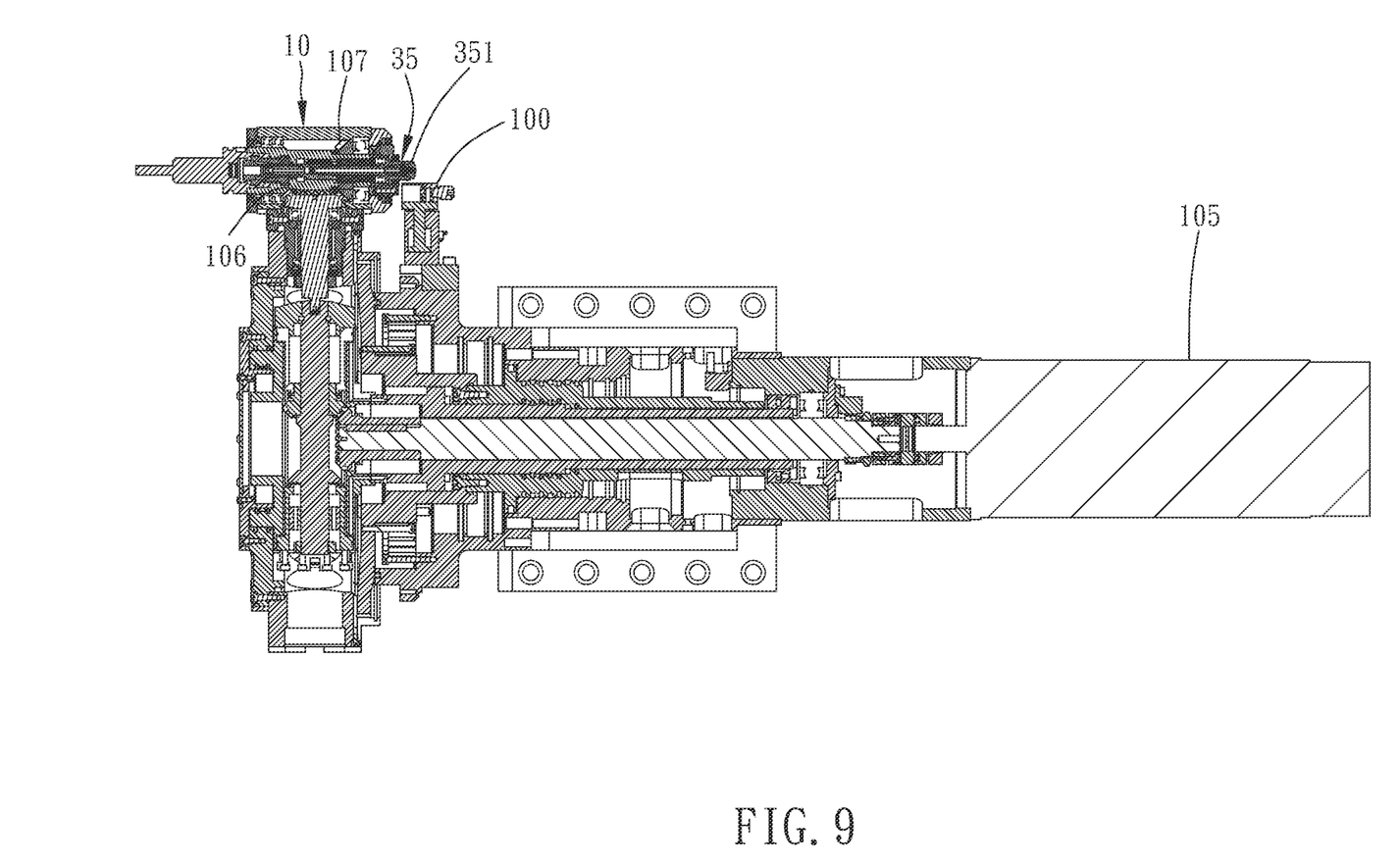
FIG. 9 is a sectional view taken along the line 9-9 in FIG. 8.

Referring to FIG. 8 and FIG. 9, the second usage of the present invention is the usage in the condition without the servomotor 103, directly used in coordination with a spindle motor 105. The spindle motor 105 is connected with a right hand bevel gear 106 and a left hand bevel gear 107. The left hand bevel gear 107 is sleeved onto the mandrel 30. When the tool changing mechanism 10 of the present invention performs the tool pulling to fix the cutting tool 110, the pneumatic cylinder 100 is operated to push the inner hexagonal sleeve 101 to be connected with the outer hexagonal end 451 of the first pulling rod 41, and then the forward rotation of the spindle motor 105 drives the right hand bevel gear 106 and the left hand bevel gear 107 to rotate, so as to drive the mandrel 30 to rotate. When the tool changing mechanism 10 is in the tool loosening status as shown in FIG. 5, the disc spring 47 is in the relieved status, so the space S doesn't exist at this time. The sliding key 56 of the second pulling rod 51 is limited by the keyway 33 of the mandrel 30, thereby only movable along the longitudinal axis of the mandrel 30, which means when the spindle motor 105 rotates forward to make the second pulling rod 51 approach the first pulling rod 41, it causes the pressing head 58 and the pulling jaws 53 the pressing state, i.e. changed from the status as shown in FIG. 5 to the status as shown in FIG. 4, thereby attaining the tool pulling effect. After that, the spindle motor 105 continues driving the second pulling rod 51 to rotate. At this time, the pressing head 58 and the pulling jaws 53 are in the pressing state, so the second pulling rod 51 no longer moves, resulting in that the first pulling rod 41 starts to approach the second pulling rod 51 along the mandrel 30 and compress the disc spring 47, i.e. changed from the status as shown in FIG. 4 to the status as shown in FIG. 3. When the disc spring 47 is completely compressed, the spindle motor 105 stops rotating, and the pneumatic cylinder 100 separate the inner hexagonal sleeve 101 from the outer hexagonal end 451 of the connecting portion 45, so that the tool changing mechanism 10 of the present invention completes the tool pulling action for fixing the cutting tool 110.

When the tool changing mechanism 10 of the present invention is intended for tool loosening for the previously fixed cutting tool 110 to be removed, the second usage of the present invention performs the same tool loosening process. The pneumatic cylinder 100 is operated again to push the inner hexagonal sleeve 101 to be connected with the outer hexagonal end 451 of the first pulling rod 41, and the backward rotation of the spindle motor 105 drives the right hand bevel gear 106 and the left hand bevel gear 107, so as to drive the mandrel 30 to rotate. Because the disc spring 47 is compressed to provide the space S in the final part of the tool pulling status of the tool changing mechanism 10 as shown in FIG. 3, the first pulling rod 41 starts to leave the second pulling rod 51 along the mandrel 30, changed from the status as shown in FIG. 3 to the status as shown in FIG. 4, and the disc spring 47 is relieved. Until the disc spring 47 is completely relieved and the space S is filled, the first pulling rod 41 no longer moves. At this time, the spindle motor 105 continues driving the second pulling rod 51 to rotate, so it makes the second pulling rod 51 start to leave the first pulling rod 41, i.e. changed from the status as shown in FIG. 4 to the status as shown in FIG. 5, causing the pressing head 58 and the pulling jaws 53 the relieve pressing state, so that the tool changing mechanism 10 of the present invention completes the tool loosening action for the cutting tool 110 to be removed.

As a result, the present invention provides a tool changing mechanism having the function of controlling loosening and pulling the tool in the condition without the servomotor 103, which directly uses the spindle motor 105 to drive the second pulling rod 51 to rotate, so that the tool changing mechanism 10 of the present invention can complete the tool pulling and fixing action or the tool loosening action for the cutting tool 110 to be removed, effectively save cost, and improve the convenience.

Other effects attained by the present invention are approximately the same with those in the first usage, thereby not repeatedly mentioned here.

What is claimed is:

1. A tool changing mechanism having a function of controlling loosening and pulling a tool, the tool changing mechanism comprising:
   a tool base housing provided therein with an accommodating space;
   a mandrel disposed in the tool base housing and located in the accommodating space, the mandrel being formed therein with a chamber communicating with two ends of the mandrel, the chamber of the mandrel being axially provided in a middle section thereof with a keyway, the chamber being formed with a first shoulder portion located at an end of the keyway, and a predetermined number of pulling jaws being pivotably disposed at another end of the keyway;
   a first linked unit located in the chamber, the first linked unit having a first pulling rod, an end of the first pulling rod having an external thread, and another end of the first pulling rod having a connecting portion for connecting a pneumatic cylinder; and
   a second linked unit located in the chamber, the second linked unit having a second pulling rod and a pressing head, the second pulling rod being arranged along an axis of the mandrel, an end of the second pulling rod having an internal thread, the pressing head being disposed at another end of the second pulling rod, the second pulling rod being provided with a sliding key, the sliding key corresponding to the keyway of the mandrel, the internal thread of the second pulling rod being screwed onto the external thread of the first pulling rod, and relative screwing rotation therebetween enabling the second pulling rod and the first pulling rod to approach or leave each other, the pressing head approaching the pulling jaws to bring a pressing state when the second pulling rod approaches the first pulling rod, and the pressing head leaving the pulling jaws to bring a relieved pressing state when the second pulling rod leaves the first pulling rod;
   wherein the first linked unit further has a spacer ring, an anti-thrust space ring, and a bearing, the spacer ring is located between the first shoulder portion and a disc spring; the anti-thrust spacer ring is located between the disc spring and the bearing; and the disc spring is abutted against the first shoulder portion and a second should portion indirectly.

2. The tool changing mechanism as claimed in claim 1, wherein the first linked unit further has the disc spring; and the disc spring is sleeved onto the first pulling rod;

the first pulling rod further has the second shoulder portion; and when the disc spring is compressed, a space is formed between the second shoulder portion and an end edge of the mandrel.

\* \* \* \* \*